(12) United States Patent
Acharya

(10) Patent No.: US 9,087,066 B2
(45) Date of Patent: Jul. 21, 2015

(54) VIRTUAL DISK FROM NETWORK SHARES AND FILE SERVERS

(75) Inventor: Soubir Acharya, Pleasantville, NY (US)

(73) Assignee: SWISH DATA CORPORATION, Warwick, NY (US)

(*) Notice: Subject to any disclaimer, the term of this patent is extended or adjusted under 35 U.S.C. 154(b) by 361 days.

(21) Appl. No.: 12/766,778

(22) Filed: Apr. 23, 2010

(65) Prior Publication Data

US 2010/0274784 A1  Oct. 28, 2010

Related U.S. Application Data

(60) Provisional application No. 61/172,218, filed on Apr. 24, 2009, provisional application No. 61/176,098, filed on May 6, 2009, provisional application No. 61/218,419, filed on Jun. 19, 2009.

(51) Int. Cl.
*G06F 17/30* (2006.01)

(52) U.S. Cl.
CPC .................... *G06F 17/3012* (2013.01)

(58) Field of Classification Search
CPC .................................... G06F 17/3012
USPC .................... 707/736, 812, 825, 809, E17.01, 707/E17.032, E17.095, E17.143
See application file for complete search history.

(56) References Cited

U.S. PATENT DOCUMENTS

| | | | |
|---|---|---|---|
| 5,129,088 A * | 7/1992 | Auslander et al. | 711/1 |
| 6,356,863 B1 * | 3/2002 | Sayle | 703/27 |
| 7,076,509 B1 * | 7/2006 | Chen et al. | 1/1 |
| 7,080,051 B1 * | 7/2006 | Crawford | 705/400 |
| 7,107,385 B2 * | 9/2006 | Rajan et al. | 711/4 |
| 7,225,314 B1 * | 5/2007 | Bonwick et al. | 711/170 |
| 7,356,679 B1 * | 4/2008 | Le et al. | 713/1 |
| 7,401,093 B1 * | 7/2008 | Hamilton et al. | 1/1 |
| 7,437,530 B1 * | 10/2008 | Rajan | 711/206 |
| 7,526,558 B1 * | 4/2009 | Pittman | 709/227 |
| 7,546,307 B2 * | 6/2009 | Terrell, II | 1/1 |
| 7,584,279 B1 * | 9/2009 | Chapman | 709/226 |
| 7,590,807 B2 * | 9/2009 | McGovern et al. | 711/159 |
| 7,627,710 B1 * | 12/2009 | Todd et al. | 711/1 |
| 7,636,744 B1 * | 12/2009 | Aggarwal et al. | 1/1 |
| 7,676,760 B1 * | 3/2010 | Rosenquist et al. | 715/789 |
| 7,680,844 B2 * | 3/2010 | Brown | 707/999.204 |
| 7,685,126 B2 * | 3/2010 | Patel et al. | 707/770 |
| 7,743,033 B2 * | 6/2010 | Patel et al. | 707/652 |

(Continued)

OTHER PUBLICATIONS

De Jonge W., "The Logical Disk: A New Approach to Improving File Systems", In Operating Systems Review 27.5: pp. 15-28 (14 pages), Dec. 1993.*

(Continued)

*Primary Examiner* — Phuong Thao Cao
(74) *Attorney, Agent, or Firm* — Sheridan Ross P.C.

(57) ABSTRACT

A system manages a file directory containing data that is exposed by a file-server. The system provides a block-device layered on top of a network share that treats the underlying network share as read-only but allows local file-system semantics to operate on top of the network share. The end-result is a virtual disk containing a locally recognizable file-system that can read and write from the perspective of the operating system but where the data is store in the cloud as network shares. The virtual disk appears to be a fully functional local disk with all the expected local disk semantics.

19 Claims, 9 Drawing Sheets

(56) References Cited

U.S. PATENT DOCUMENTS

| | | | |
|---|---|---|---|
| 7,783,611 B1* | 8/2010 | Hamilton et al. | 707/690 |
| 7,809,883 B1* | 10/2010 | Fair et al. | 711/113 |
| 7,810,092 B1* | 10/2010 | van Rietschote et al. | 718/1 |
| 7,937,453 B1* | 5/2011 | Hayden et al. | 709/219 |
| 7,945,726 B2* | 5/2011 | Faibish et al. | 711/112 |
| 8,117,168 B1* | 2/2012 | Stringham | 707/646 |
| 8,190,850 B1* | 5/2012 | Davenport et al. | 711/202 |
| 8,335,765 B2* | 12/2012 | Sivasubramanian et al. | 707/639 |
| 8,407,448 B1* | 3/2013 | Hayden et al. | 711/203 |
| 8,429,242 B1* | 4/2013 | Todd | 709/217 |
| 8,468,455 B2* | 6/2013 | Jorgensen et al. | 715/733 |
| 8,725,967 B2* | 5/2014 | DeSantis et al. | 711/162 |
| 8,903,772 B1* | 12/2014 | Hayden | 707/649 |
| 8,918,488 B2* | 12/2014 | Umbehocker | 709/221 |
| 2002/0049778 A1* | 4/2002 | Bell et al. | 707/200 |
| 2002/0059623 A1* | 5/2002 | Rodriguez et al. | 725/91 |
| 2002/0133491 A1* | 9/2002 | Sim et al. | 707/10 |
| 2003/0101239 A1* | 5/2003 | Ishizaki | 709/219 |
| 2003/0110351 A1* | 6/2003 | Blood et al. | 711/111 |
| 2004/0030822 A1* | 2/2004 | Rajan et al. | 711/4 |
| 2004/0225837 A1* | 11/2004 | Lewis | 711/118 |
| 2005/0091266 A1* | 4/2005 | Hasegawa | 707/103 R |
| 2005/0154825 A1* | 7/2005 | Fair | 711/113 |
| 2005/0234846 A1* | 10/2005 | Davidson et al. | 707/1 |
| 2005/0273486 A1* | 12/2005 | Keith | 709/200 |
| 2005/0289218 A1* | 12/2005 | Rothman et al. | 709/203 |
| 2006/0129558 A1* | 6/2006 | Brown et al. | 707/10 |
| 2006/0230076 A1* | 10/2006 | Gounares et al. | 707/200 |
| 2006/0248047 A1* | 11/2006 | Grier et al. | 707/2 |
| 2007/0282969 A1* | 12/2007 | Dietrich et al. | 709/217 |
| 2008/0072000 A1* | 3/2008 | Osaki et al. | 711/162 |
| 2008/0104144 A1* | 5/2008 | Rajan | 707/204 |
| 2008/0250222 A1* | 10/2008 | Gokhale et al. | 711/203 |
| 2008/0275925 A1* | 11/2008 | Kimmel | 707/204 |
| 2008/0294704 A1* | 11/2008 | Akagawa et al. | 707/204 |
| 2008/0320097 A1* | 12/2008 | Sawicki et al. | 709/216 |
| 2009/0024752 A1* | 1/2009 | Shitomi | 709/230 |
| 2009/0157942 A1* | 6/2009 | Kulkarni | 711/6 |
| 2009/0171993 A1* | 7/2009 | Arthursson | 707/100 |
| 2009/0216816 A1* | 8/2009 | Basler et al. | 707/204 |
| 2009/0276771 A1* | 11/2009 | Nickolov et al. | 717/177 |
| 2010/0076936 A1* | 3/2010 | Rajan | 707/677 |
| 2010/0088328 A1* | 4/2010 | Joshi et al. | 707/758 |
| 2010/0149572 A1* | 6/2010 | St. Jacques et al. | 358/1.13 |
| 2010/0198972 A1* | 8/2010 | Umbehocker | 709/226 |
| 2010/0274772 A1* | 10/2010 | Samuels | 707/693 |
| 2010/0299512 A1* | 11/2010 | Maruyama et al. | 713/2 |
| 2010/0332617 A1* | 12/2010 | Goodwin et al. | 709/219 |
| 2011/0066668 A1* | 3/2011 | Guarraci | 707/831 |
| 2011/0107052 A1* | 5/2011 | Narayanasamy | 711/171 |
| 2013/0185723 A1* | 7/2013 | Joshi et al. | 718/1 |

OTHER PUBLICATIONS

Fei et al., "Research of the File System of Volume Holographic Storage Based on Virtual Storage Layer", In Proceedings of SPIE, vol. 6912, 9 pages, 2008.*

Jo et al., "SSD-HDD-Hybrid Virtual Disk in Consolidated Environments", In Euro-Par'09 Proceedings of the 2009 International Conference on Parallel Processing, LNCS 6043, pp. 375-384, 2010.*

Microsoft Library, "How Virtual Disk Service Works", dated Mar. 28, 2003, 5 pages, accessed online at <https://technet.microsoft.com/en-us/library/cc739923(d=printer,v=ws.10).aspx> on Mar. 7, 2015.*

Pfaff et al., "Virtualization Aware File Systems: Getting Beyond the Limitations of Virtual Disks", The 3rd Symposium on Networked Systems Design & Implementation (NSDI '06), pp. 353-366, 2006.*

Qiao et al., "PULSTORE: Automated Storage Management with QoS Guarantee in Large-Scale Virtualized Storage Systems", In Proceedings of the Second International Conference on Autonomic Computing (ICAC'05), 2 pages, IEEE Computer Society, 2005.*

Xiao et al., "Flexible Metadata Management for Block-Level Storage System", In Proceedings of the Seventh ACIS International Conference on Software Engineering, Artificial Intelligence, Networking, and Parallel/Distributed Computing (SNPD'06), 6 pages, IEEE Computer Society, 2006.*

Yi et al., "The File System Research Based on the Volume Holographic Data Storage", Seventh International Symposium on Optical Storage, Proceedings of SPIE, vol. 5966, 6 pages, 2005.*

* cited by examiner

VIRTUAL DISK FROM NETWORK SHARES AND FILE SERVERS

CROSS REFERENCE TO RELATED DOCUMENTS

This application is a non-provisional application of and claims priority to U.S. Provisional Patent Application No. 61/172,218, filed Apr. 24, 2009, entitled "VIRTUAL DISKS AND BOOTABLE VIRTUAL DISKS FROM NETWORK SHARES AND FILE SERVERS"; U.S. Provisional Patent Application No. 61/176,098, filed May 6, 2009, entitled "CLOUDSAFE—MULTI-FUNCTION CLOUD STORAGE AND ON-DEMAND WORKPLACE GATEWAY"; and U.S. Provisional Patent Application No. 61/218,419, filed Jun. 19, 2009, entitled "BACKUP MEDIA CONVERSION VIA INTELLIGENT VIRTUAL APPLIANCE ADAPTER" which are incorporated by reference herein for all that the provisional patent applications teach.

BACKGROUND

Storage of enterprise data has moved from local storage to networked storage in the cloud. No technique currently exists that can expose cloud-stored file data as block data that may be exposed to servers. Generally, file data is exposed to servers using file-level protocols. Generally, data stored in the cloud cannot be easily processed or consumed, unless presented as block storage. Therefore, other systems are required and the ability to access and use cloud data is more difficult or leads to application incompatibilities.

SUMMARY

It is with respect to the above issues and other problems that the embodiments presented herein were contemplated. Embodiments of systems and methods described herein provide disk virtualization where network share data can be represented as a local disk for a computer system. A disk virtualization system creates a virtual disk. The virtual disk is a representation of a local disk. The virtual disk has associated metadata that is exposed to the local file system of the computer system. To appear as a local disk, the metadata provides the required information to the computer system that would make the virtual disk appear as a full-fledged local file-system. Further, each file stored in the network share needs metadata that wraps the file. The metadata wrapper provides the necessary information for the file system to have files exposed via the network share appear as locally-stored files with requisite on-disk structures.

Given a directory containing useful data that is exposed by a file-server either via NFS, CIFS or other file oriented protocol, create a block-device layered on top of the network share that treats the underlying share as read-only but allows local file-system semantics to operate on top. The end-result is a disk containing a locally recognizable file-system like NTFS, or EXT3, etc. (depending on what the operating system is capable of understanding) that is read-write from the perspective of the OS and is a fully functional local disk with all the expected local disk semantics.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The term "in communication with" as used herein refers to any coupling, connection, or interaction using electrical signals to exchange information or data, using any system, hardware, software, protocol, or format.

The term "virtual" or "virtualization" as used herein refers to a logical representation of some other component, such as a physical disk drive. In other words, the "virtual" component is not actually the same as the physical component it represents but appears to be the same to other components, hardware, software, etc. of a computer system.

The term "disk" as used herein refers to a storage disk or other memory that can store data for a computer system.

The term "cloud" or "cloud computing" as used herein refers to Internet-based computing, whereby shared resources, software, and information are provided to computers and other devices on-demand, like a public utility.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It should be understood that various changes may be made in the function and arrangement of elements without departing from the spirit and scope of the appended claims.

Figure 1:
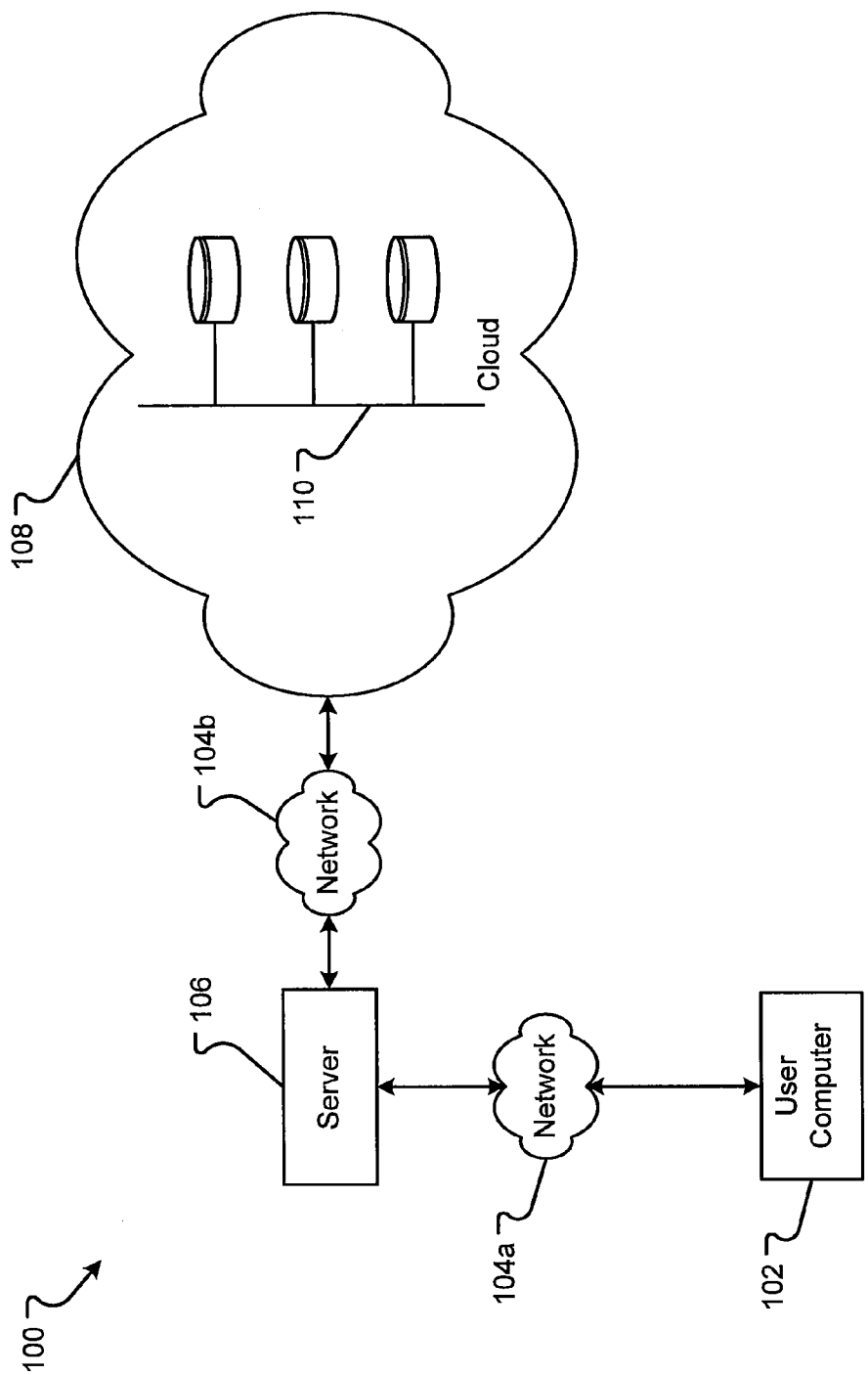
FIG. 1 is a block diagram of an embodiment of a disk virtualization system operable to create a virtual disk for a computer system.

An embodiment of a disk virtualization system 100 is shown in FIG. 1. A disk virtualization system 100 can create a virtual disk at a server 106 or a user computer 102. The virtual disk can expose network share data, stored in a cloud 108, as a local disk at the server 106 or user computer 102. The disk virtualization system 100 can include one or more components including, but not limited to, a user computer 102, one or more networks 104a and 104b, a server 106, and a cloud 108.

Figure 8:
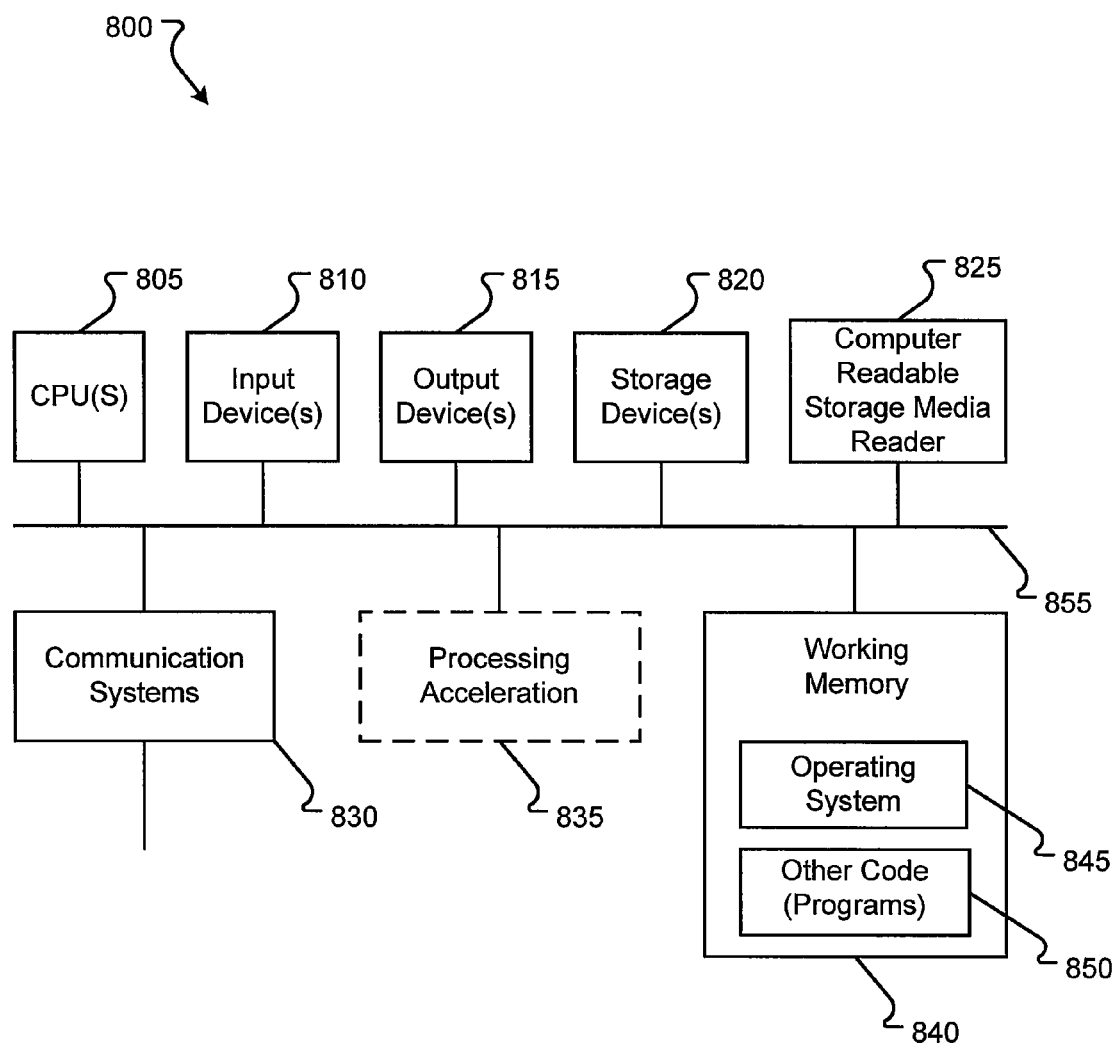
FIG. 8 is a block diagram of an embodiment of a computer system.

Both the user computer 102 and the server 106 are computer systems such as those described in conjunction with FIGS. 8 and 9. A user computer 102 can be any end user device, such as, a personal computer, a laptop, a mobile device, or some other computer system. A server 106 can also be a computer system, such as those described in conjunction with FIGS. 8 and 9, that stores or shares data with one or more user computers, such as, user computer 102. The server 106 may include one or more storage arrays or disks locally that store data for one or more users.

The user computer 102 can be in communication with the server 106 through a network 104a and the server 106 in communication with the cloud 108 through network 104b. A network 104 can be a local area network (LAN), a wide area network (WAN), an intranet, a wireless network, the Internet, etc. The network 104 can function to allow communications between one or more computer systems. The network 104 may communicate in any protocol or format understood by any type of computer system, such as, TCP/IP, RTP, etc. Regardless, the network 104 can exchange communications between a user computer 102, the server 106, and/or the cloud 108.

The cloud 108 represents networked applications and storage that may be executed by one or more systems within a networked environment. The cloud 108 can include one or more servers. In embodiments, the cloud 108 includes a storage system 110. The storage system 110 can be a storage area network (SAN), a disk array, or some other storage that allows the server 106 to store data in the cloud 108 as network shares.

Figure 2A:
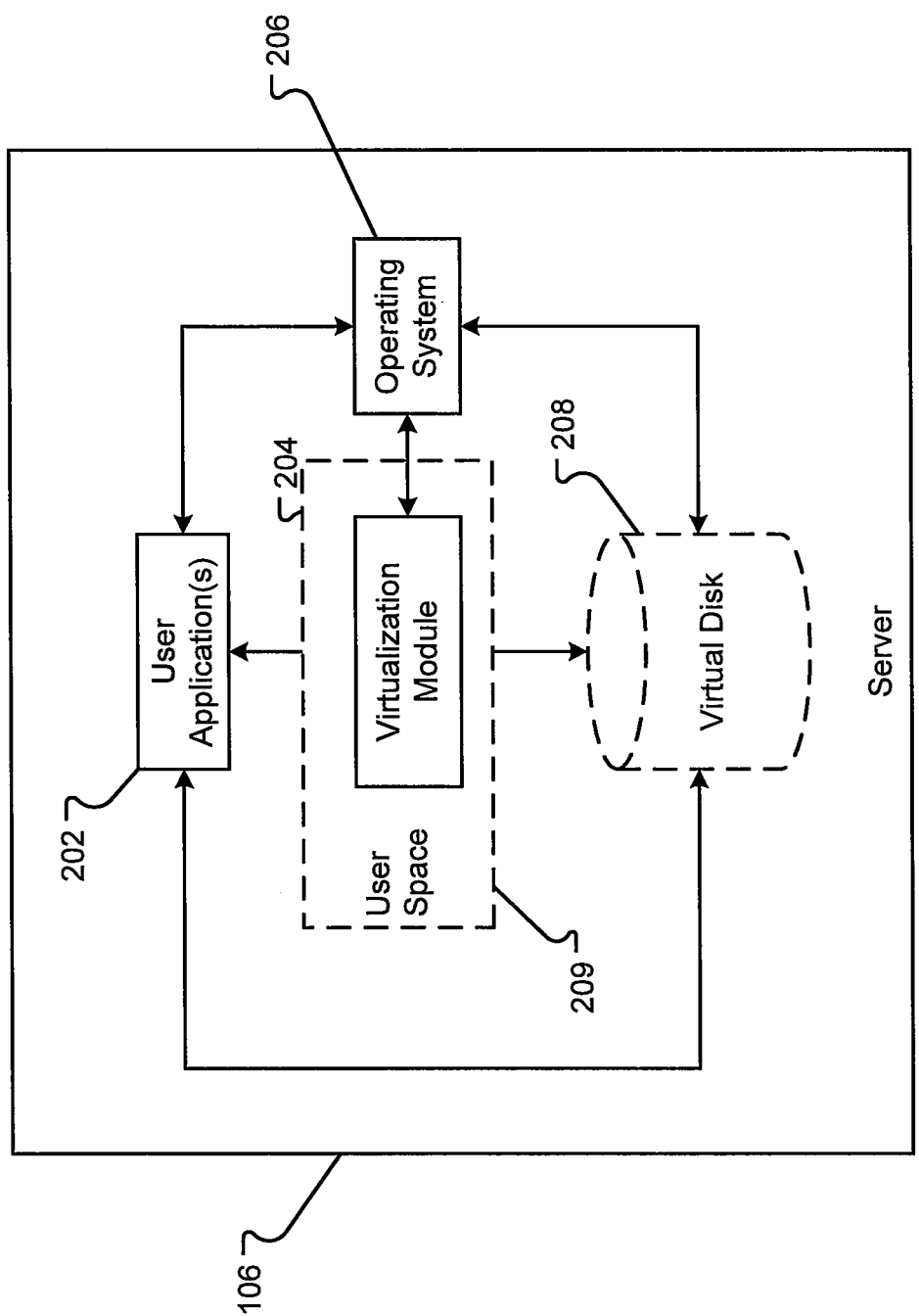
FIG. 2A is a block diagram of a server that includes a virtualization module.

An embodiment of the server 106 is shown in FIG. 2A. The server 106 is shown as having a virtualization module 204 in FIG. 2A. It should be noted that the user computer 102 may also include a virtualization module 204 as described herein. As such, the description of FIG. 2A can apply to either the server 106 or the user computer 102 shown in FIG. 1. Generally, the server 106 can include one or more user applications 202, the virtualization module 204, an operating system 206, and one or more virtual disks 208.

The one or more user applications 202 can be any software that provides functionality to a user. The user applications 202 can include services or other functions that provide functionality between the server 106 and the user computer 102. User applications are understood in the art and will not be explained further. The operating system 206 can be any operating system for the server, such as, Windows Server or Linux. The operating system 206 controls the execution of processes or user applications 202 and any other functions of the server 106. Operating systems 206 are also well known in the art and will not be explained further.

A virtualization module 204 is operable to create and communicate with a virtual disk 208. The virtualization module 204 can be software executed by the operating system 206 in the server 106. However, in other embodiments, the virtualization module 204 may be embodied in hardware such as an application specific integrated circuit (ASIC) or a field programmable gate array (FPGA). Further, the virtualization module 204 may be a separate function executed by a third party. An embodiment of the virtualization module 204 is shown in FIG. 2B.

The virtual disk 208 can be a logical representation of a physical storage disk or memory exposed to the operating system 206. The virtual disk 208 can include information that directs the server 106 to obtain file data stored in the cloud 108. The data stored in the cloud 108 can be file data that can be read in and returned to operating system 206 or to the user application 202. User space 209 refers to the section of virtual memory used to execute user applications. A conventional operating system usually segregates virtual memory into kernel space and user space. Kernel space is reserved for running the kernel, kernel extensions, and most device drivers and user space 209 is the memory area where all user mode applications work and this memory can be swapped out when necessary.

Figure 2B:
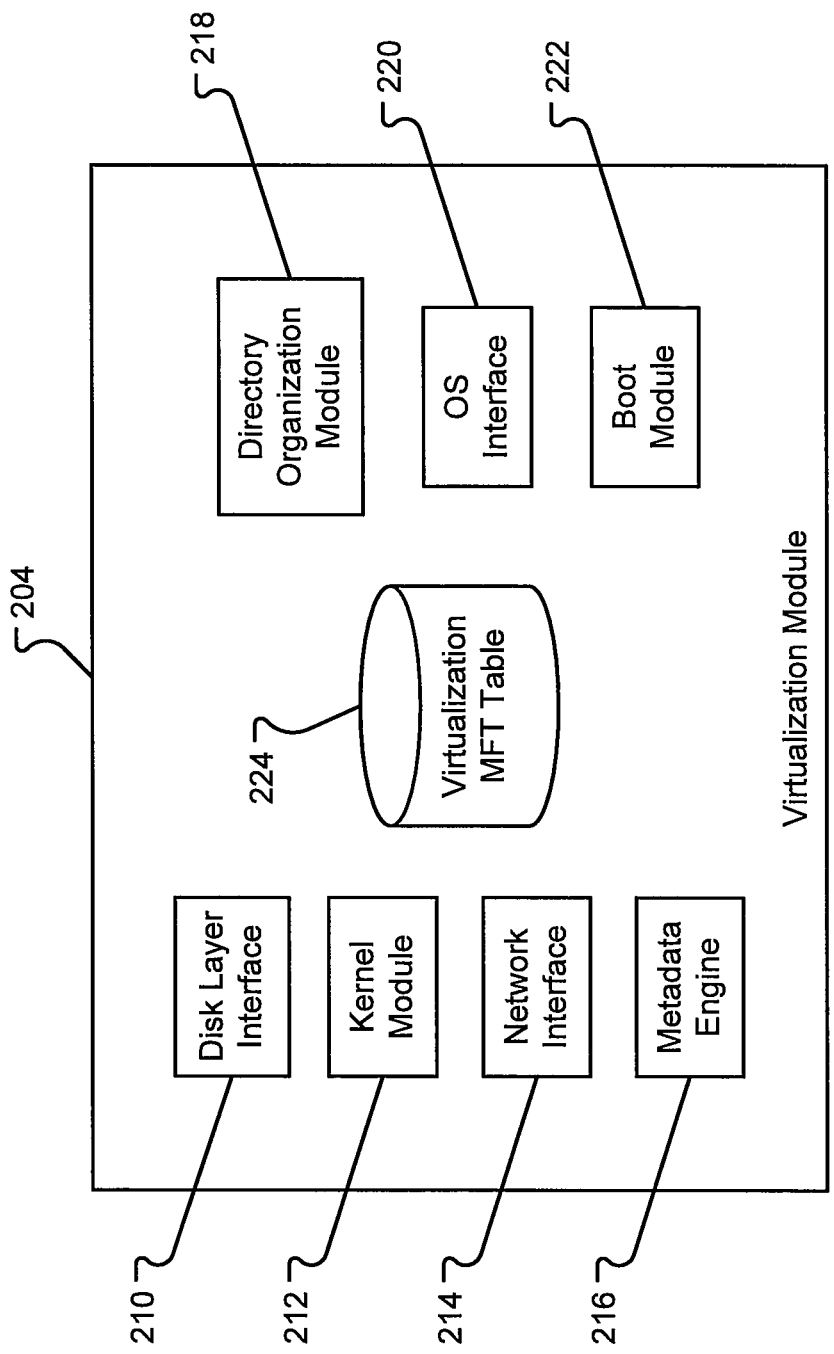
FIG. 2B is a block diagram of the virtualization module components operable to create a virtual disk.

An embodiment of the virtualization module 204 is shown in FIG. 2B. The disk layer interface 210 is operable to interface between the virtual disk 208 and the operating system 206 and/or user application(s) 202. The disk layer interface 210 receives read or store requests for data from the operating system 206 and exposes the virtual disk 208 to the operating system 206. As such, the disk layer interface 210 can provide any information or data to the operating system 206 or user application(s) 202 such that the virtual disk 208 appears as a physical disk to the local file system executed by the operating system 206.

A kernel module 212 provides the operational functionality for the virtualization module 204. The kernel module 212 can interface with any other module in the virtualization module 204 to send or receive data. The kernel module 212 can command one or more other interface or modules within the virtualization module 204. Thus, the kernel module 212 can organize, manage, or execute the different functions within the virtualization module 204.

A network interface 214 is operable to communicate between the server 102 and the cloud 108. Thus, the network interface 214 can send or receive data blocks from the cloud 108. Thus, when a file is read into the server 106, the network interface 214 can read in blocks of data for the file and return those blocks of data to the disk layer interface 210 to be sent to the operating system 206 and/or the user application 202. The network interface 214 may communicate with the file system in the cloud which may be network file system (NFS), a Linux file system, Common Internet File System (CIFS), a Microsoft Server file system, or other file system.

A metadata engine 216 can create, modify, store, or retrieve metadata that is used to create the virtual disk and expose the virtual disk to the operating system 206. As such, the metadata engine 210 can create a metadata wrapper for the file system and each file stored within the virtual disk 208. In an embodiment, the file system used by the operating system 206 may be New Technology File System (NTFS), a Windows NT file system, may require a master file table that may be stored in the virtualization master file table database 224. The master file table will be described herein after but one skilled in the art will understand the other metadata that may be required in the "master file table" if another file system is used, such as third extended file system (EXT3), a Linux file system, or another file system. The metadata engine provides the metadata required to expose the virtual disk 208 to the operating system 206.

A directory organization module 218 can provide the data required to give a directory structure to the virtual disk 208. The directory structure provides a root directory and then one or more subdirectories that can organize the files within the virtual disk 208. Thus, the files, stored within the virtual disk 208, are managed similar to an actual physical disk. Further, a hierarchy of directories and files can be exposed to the file system used by the operating system 206.

An operating system interface 220 can provide the hooks or pointers from the operating system commands to the virtual disk 208. For example, if an operating system attempts to write information to the virtual disk 208, the operating system interface 220 can intercept those commands and provide the commands to the disk layer interface 210 to be executed with the virtual disk 208. Further, any write commands, read commands, or other commands may be intercepted or sent between the virtualization module 204 and the operating system 206 by the operating system interface 220, such that the operating system interface 220 provides the appearance, to the operating system 206, that the virtual disk 208 is an actual physical disk in the local computer system.

A boot module 222 provides the jumps, pointers, links, metadata, and different operating requirements to use the virtual disk 208 as a boot disk. A boot disk is used to boot the server 106 at start-up or during other occasions. The boot module 222 provides the specific functionality for booting the server 102 from the virtual disk 208.

Finally, the virtualization master file table database 224 contains the one or more master file tables that store the metadata created by the metadata engine 216 and used by the one or more other modules or interfaces. The virtualization master file table (MFT) database 224 can be any type of storage or data system that exposes data, stores data, retrieves data, or modifies data for one or more components. The virtualization MFT database 224 can store one or more MFT tables as described in conjunction with FIG. 3.

Figure 3:
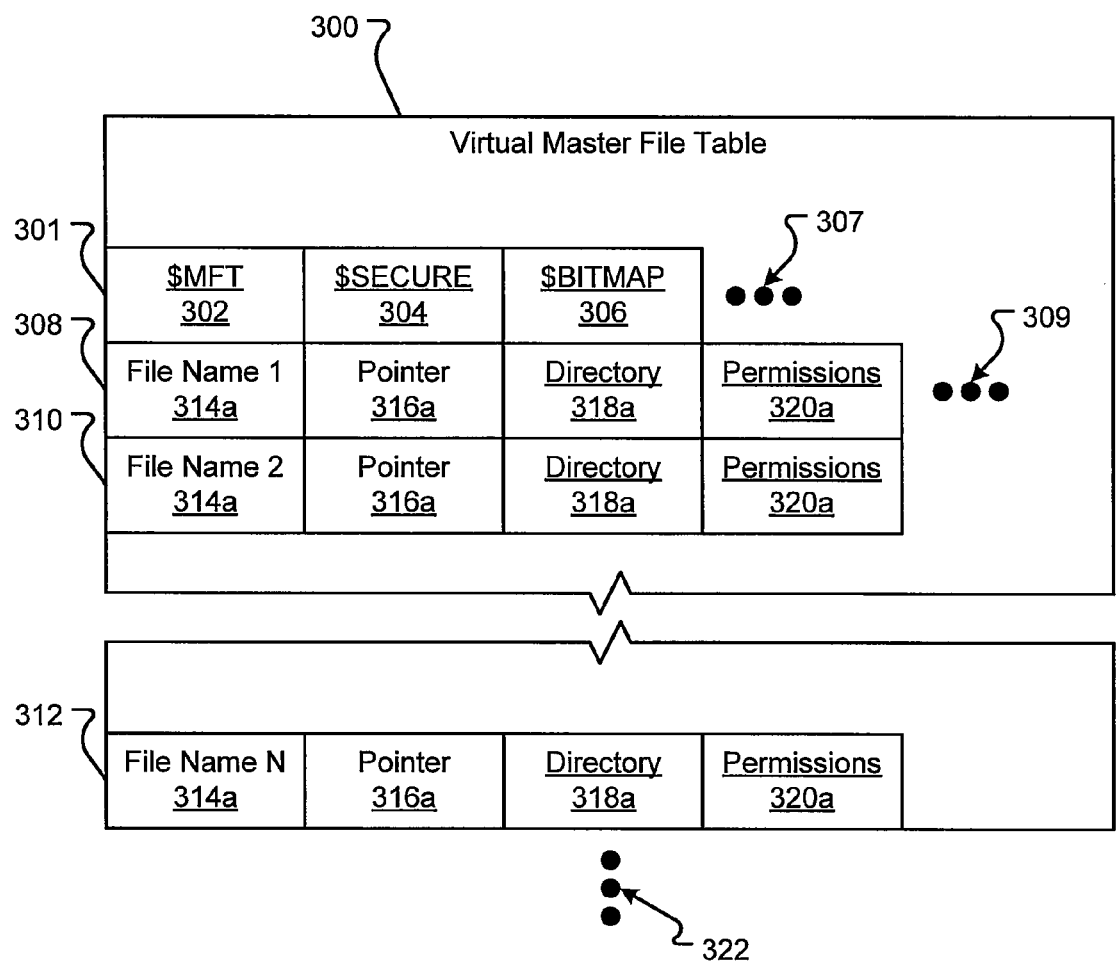
FIG. 3 is a block diagram of embodiments of a virtual master file table data structure.

An embodiment of a virtual master file table (VMFT) data structure 300 is shown in FIG. 3. The VMFT data structure 300 can be stored in several different forms or in different types of databases or data storage systems, such as relational databases, flat files, object-oriented databases, etc. Thus, while the term "data field" or "segment" is used, the data may be stored in an object, an attribute of an object, or some other form of data structure. Further, at least portions of the VMFT data structure 300 can be stored, retrieved, sent, or received during the operation of the virtual disk by the server 106 or the user computer 102. The VMFT data structure 300 stores one or more items of information in one or more data fields. The numeric identifiers (e.g. 302, 304, etc.), shown in FIG. 3, can both identify either the data field/segment or the data stored in the data field/segment.

An embodiment of a virtual master file table 300 is shown in FIG. 3. The virtual master file table 300 can be any type of data structure that can store metadata or other information required by the virtualization module 204 to expose and create the virtual disk 208. One or more virtual master file tables may exist for each virtual disk 208. In embodiments, the virtual disk 208 may be organized into one or more partitions wherein each of the partitions has a separate virtual master file table 300. In other embodiments, each partition may have two or more virtual master file tables 300 that describe different parts of the virtual disk 208.

The virtual master file table 300 can include one or more items of metadata that can create the file system or interface with the file system used by the operating system 206. For example, there may be one or more items such as those shown in data structure section 301 that are used by the operating system 206 to both understand and interface with the virtual disk 208. For example, with an NTFS file system, the file system may require special files like $Secure, $Bitmap etc. These fields may allow the operating system 206 to organize or manage the files, within the virtual disk 208, with the file system used by the operating system 206. There may be more or fewer fields of metadata than those shown in FIG. 3 used to interface with the file system, as represented as ellipses 307.

The virtual file table 300 may also include one or more items of metadata for each file that is stored within the virtual disk 208. For example, there may be a separate row or entry for each file, such as, row 308, 310, and 312. Each of the different rows may have the same or different metadata and may include more or fewer fields or segments than those shown in FIG. 3, as represented by ellipses 309. An embodiment of the data stored for each file may be the file name 314, the pointer 316, the directory segment 318, and the permission segment 320. A file name 314 may be a unique file name used by the file system to identify that file for use. The file name 314 can be a globally unique identifier (GUID). An example of one GUID that may be used for the file name 314 is a hash of the file name or inode directory in the network share on the cloud 108. This hash can create a unique filename that is not likely to be duplicated. As data is not actually stored within the virtual disk 208, a pointer segment 316 can include one or more pointers 316 that point to the network shares that include the raw data for the file. As such, when the file is accessed on the virtual disk 208, the disk layer interface 210 can send a message to the kernel module 212 with the identity of the file 308. From that identity, the network interface 214 can retrieve the pointers 316 and send requests for block data to the cloud 108. The data blocks may be read in and sent back to the disk layer interface 210 as the file.

A directory segment 318 may include one or more items of metadata used to assign the file to a directory. For example, the directory metadata 318 can include information as to which directory the file belongs. As such, disk directory metadata 318 can be used by the directory organization module 218 to organize the file as a root directory object or an object in a subdirectory. A permissions segment 320 can include can include the permissions for the file. Permissions may include which users may access, write, read, or modify the data within the file. These permissions may include a list of different types of users or the identities of users that may access the file. In other embodiments, the permissions segment 320 may also include user names, passwords, or other verification information that can be used to verify that the user can access the file. The virtual master file table 300 can include more information than that shown in order to expose and create the virtual disk 208, as represented by ellipses 322.

Figure 4:
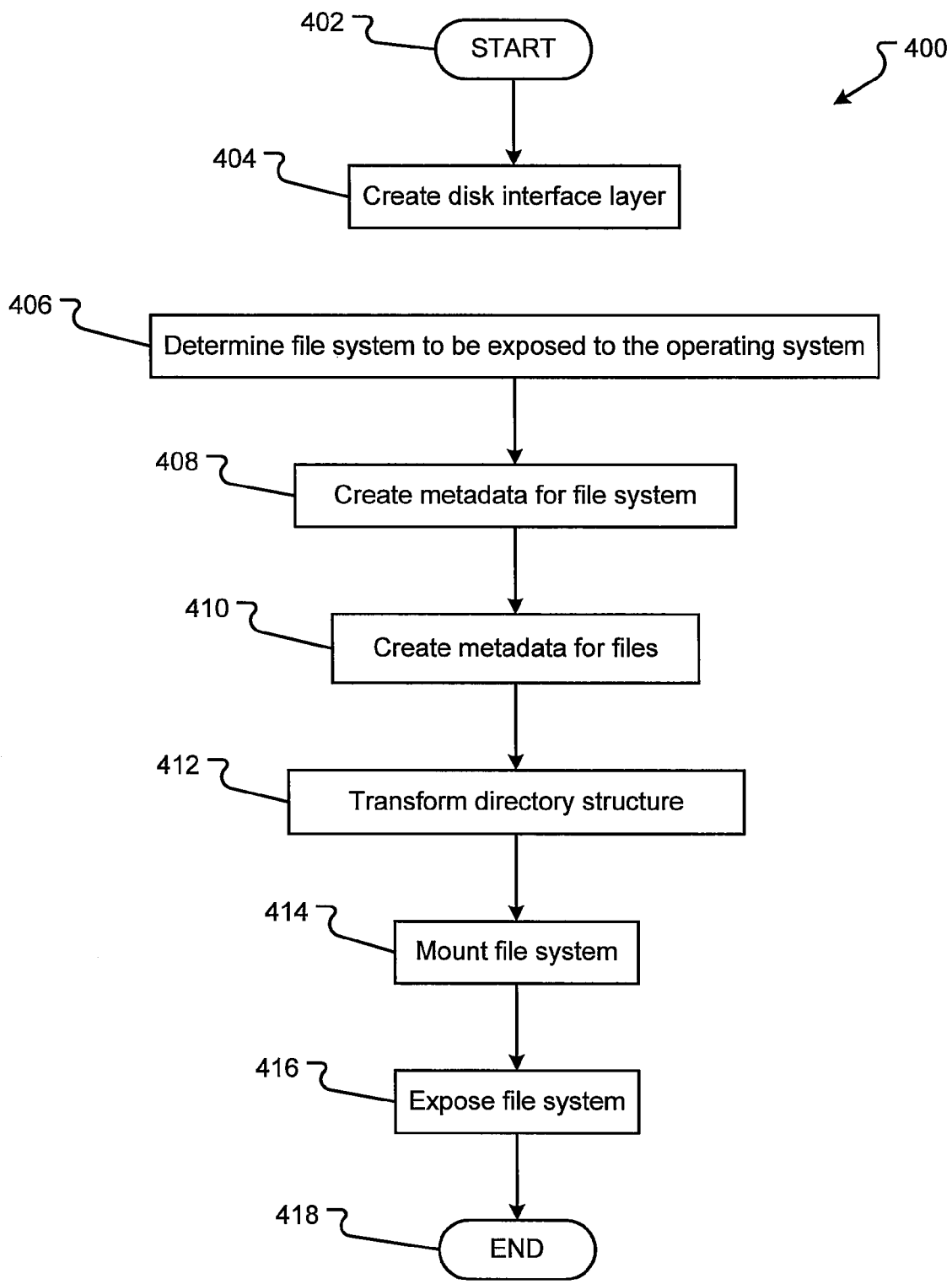
FIG. 4 is a flow diagram of an embodiment of a process for creating a virtual disk

An embodiment of a process or method 400 for creating a virtual disk 208 is shown in FIG. 4. Generally, the method 400 begins with a start operation 402 and terminates with an end operation 418. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, etc. described in conjunction with FIGS. 1-3.

A virtualization module 204 creates a disk interface layer, in step 404. The disk layer interface 210 of the virtualization module 204 creates one or more hooks into the operating system 206 to create the disk interface layer. The disk interface layer provides a communications interface between the operating system 206 and the virtual disk 208. This disk interface layer ensures that any accesses to the virtual disk 208 is directed through the virtualization module 204 and, more specifically, the disk layer interface 210.

The virtualization module 204 determines the type of file system to be exposed to the operating system, in step 406. The file system may be any file system understood by the server 106 or the user computer 102 to read, write, or interface with files stored in memory or in the physical disks of the server 106 or user computer 102. Examples of the file systems may be the EXT3 file system, typically used with Linux systems, or NTFS, typically used with Microsoft servers. The type of file system is important for implementation in that the type of metadata created by the virtualization module 204 will depend on the file system determined in step 406. Regardless, the metadata is created for the file system and can create any type of metadata for any type of file system.

The virtualization module 204 creates metadata for the determined file system, in step 408. The metadata engine 216 can create the metadata for the file system. For example, the file system data in row 301 of the virtual master file table 300 may be created by the metadata engine 216 in step 408. As such, any file system metadata required to communicate between the operating system and the virtual disk may be created by the metadata engine 216.

The metadata engine 216 may also create metadata for one or more files, in step 410. Thus, the metadata engine 216 can create the file metadata in rows 308, 310, and 312. This metadata ensures that the operating system 206 can access the files through the file system that are stored on the virtual disk 308. Again, the metadata for the files is dependent on the type of file system. An example of that metadata is shown in the virtual master file table 300.

The directory organization module 218 may then transform the directory structure on the one or more network shares, in the cloud 108, into a local directory structure for the virtual disk, in step 412. Network share directory structures are transformed into one or more root directory objects using the directory data 318 in the virtual master file table 300. The directory information 318 is populated with Mode information for each of the one or more remote shares. Further, the directory information 318 may also include the directory size or other information about the directories and/or other information, such as, permissions may be stored either in the directory field 318 or the permissions field 320.

This directory information may be translated or modified such that the administrator or root node owns the data for subdirectories. The subdirectories may then be transformed into local directories under the appropriate or associated root directories. More information may be stored in directory field 318 for one or more other files, such as files 310 and 312, that indicates that the other files are in subdirectories. The process of locating and filling in directory information for subdirectories is done recursively until a leaf file is found within the network share directory. The process of searching for directories and subdirectories ends when all remote Mode files and directories are examined and all entries in the VMFT 300 are provided.

After all the metadata is created and entered into the virtual master file table 300, the virtualization module 204 can cooperate with the operating system 206 to mount the virtual disk 208, in step 414. Further, the virtualization module 204 and/or operating system 206 can expose the virtual disk 208, in step 416. Thus, the virtual disk 208 is mounted and exposed as a local mount point or drive letter for the server 102. As such, the operation of the virtual disk 208 including top level directory accesses or recursive directory searches do not trigger any special code but rather interface through the virtualization module 204 to the virtual disk 208.

Figure 5:
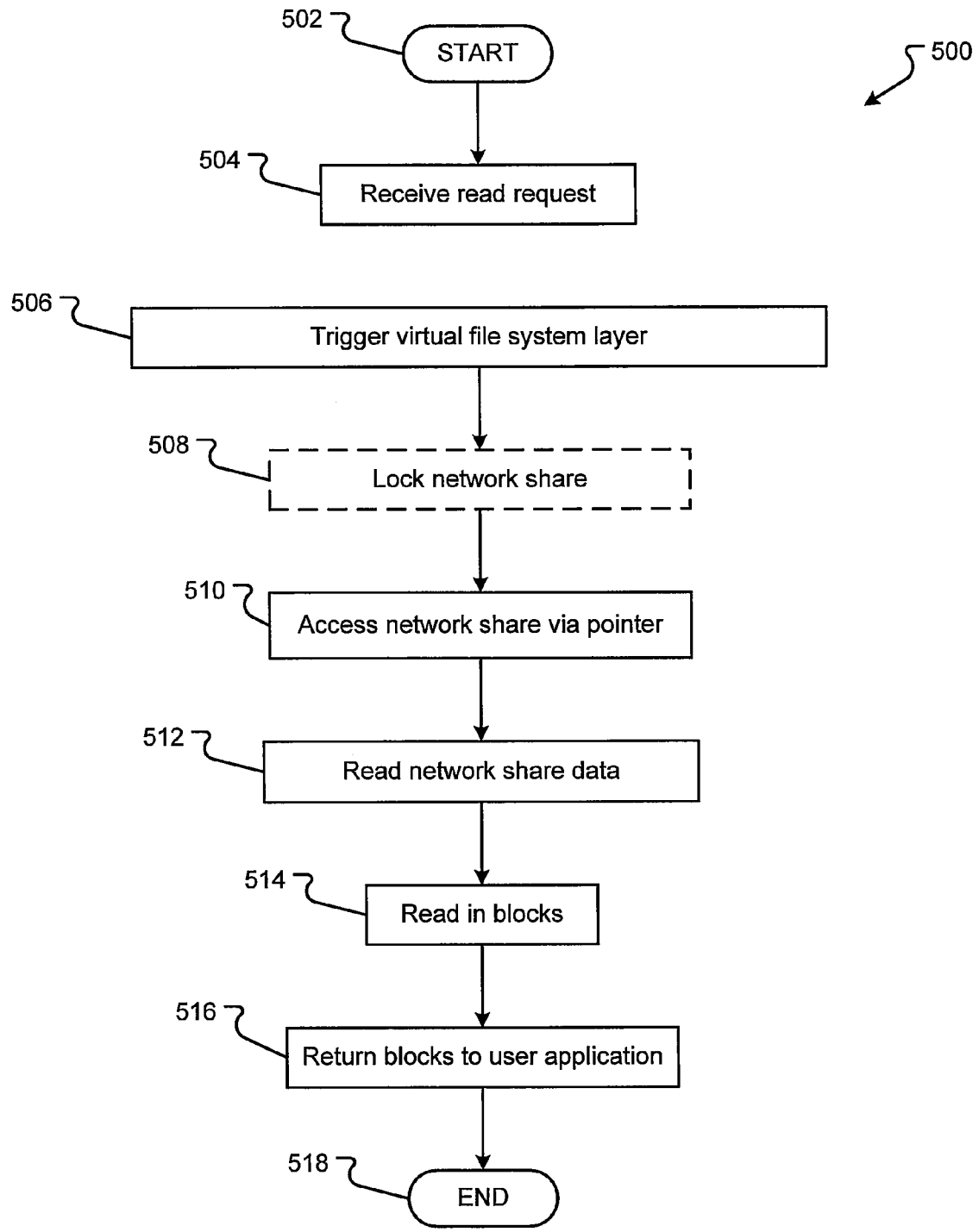
FIG. 5 is a flow diagram of an embodiment a process for reading from the virtual disk.

An embodiment of a process or method 500 for reading from a virtual disk is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-3.

The operating system 206 receives a read request, in step 504. The read request can be a request either from the operating system 206 or from a user application 202. Generally, operating systems (OS) provide mechanisms for enhancing disk sub-systems to provide functionality that is outside the scope of the base OS. The open-source Linux OS has a device mapper, a lib fuse, a systap, and other sub-systems, which add functionality and features that create both virtual disks and virtual file-systems. Some of these functions are described in "SystemTap: Instrumenting the Linux Kernel for Analyzing Performance and Functional Problems" published by IBM as REDP-4469-00 and available at ibm.com/redbooks, which is incorporated herein for all that it teaches. Other proprietary operating systems, like Microsoft Windows, also has defined means (via Disk Filter Drivers) to implement similar functionality.

The virtualization of the disk drive may have two components, one inside the kernel 212 and the other in user-space 209 (the Linux OS requires only a user-space component). Once the virtual disk 208 is setup and presented to user applications for consumption, the kernel 212 and/or the OS 206 can track reads and writes that are presented to the virtual disk 208. The disk virtualization code within the OS 206 may then use the kernel 212 of the virtualization engine 204 to redirect to the user space 209, if raw file data needs to be fetched from the network share 110. The fetch is done via a reverse OS 206 to user-space 210 interface, sometimes called "upcalls," which wake up the virtualizaton module 204 in user space 209 to trigger a network fetch of raw file data on behalf of virtual disk read. The read request, if to the virtual disk 208, may be intercepted by the virtualization module 204. If the virtualization module 204 intercepts the read request, the virtualization module 204 can then interact with the remote file share to simulate read from the virtual disk 208.

In response to receiving the read request, the virtualization module 204 triggers a virtual file system layer, in step 506. Here, the disk layer interface 210 can interact with the operating system 206 to acknowledge and execute the read request. The disk layer interface 210 accesses a virtualization MFT table 300 stored in the virtualization MFT table database 224 to access information about the file requested in the read request. The disk layer interface 210 can extract the one or more pointers 316 from a file entry 308 for the file associated with the read request. The disk layer interface 210 can pass the pointers 316 to a network interface 214 to read the data from the cloud 108.

After receiving the pointers 316, the network interface 214 can send a command through network 104b to the storage system 110 in cloud 108 to lock the network shares associated with the block data required in the read request, in step 508. The storage system 110 can lock the network shares and return an acknowledgement that the shares are locked. Thereinafter, the network interface 214 can access the network shares via the pointers 316, in step 510. Thus, the network interface 214 may interact or communicate with one or more storage systems 110 in the cloud 108 to read the distributed block data associated with the file.

The storage system 110 can read the network share data, in step 512. The network share data may be read in by the network interface 214 from the cloud 108, in step 514. Thus, the cloud 108 and the network interface 214 interact until the blocks are completely read in to the virtualization module 204. The network interface 214 can assemble the blocks into a file which may then be sent to the disk layer interface 210. The disk layer interface 210 can return the blocks as a file to the operating system 206 or user application 202, in step 516. Thus, the disk layer interface 210 transfers the data from the network shares, either as a single transmission or in two or more transmissions, to the operating system 206 or user application 202.

Figure 6:
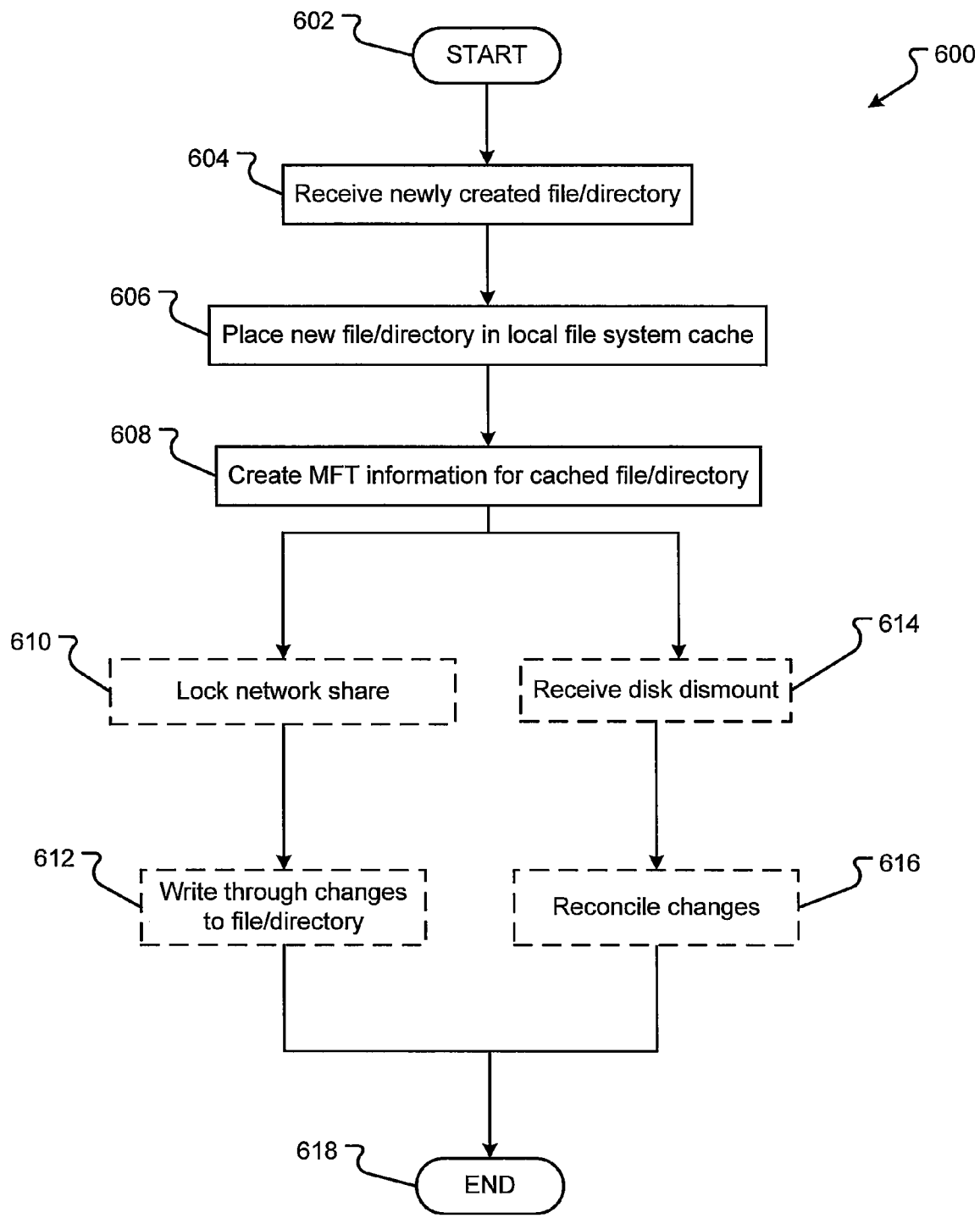
FIG. 6 is a flow diagram of an embodiment a process for writing to the virtual disk.

An embodiment of a process or method 600 for writing to a virtual disk is shown in FIG. 6. Generally, the method 600 begins with a start operation 602 and terminates with an end operation 616. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-3.

An operating system 206 can receive a write request for a file to be stored in a virtual disk 208. The read redirection flow can happen in real-time or asynchronously for enhanced performance. The user-space 209 may fetch the entire file data when a piece of the file data is requested, both on an assumption that the entire file will be read over time or limited by network file protocol which constrains fetching the file in its entirety. The write request may be received by the virtualization module 204, in step 604. The newly created file or directory associated with the write request can be received by the disk layer interface 210. The disk layer interface 210 can place or write the new file or directory to a local file system cache, in step 606. The operating system 206 or the virtualization module 204 may have access to local storage, other than the virtual disk in server 106. The written file or directory can be stored in the local storage system that may operate as a file system cache. The disk layer interface 210 may then pass information to the metadata engine 216.

The metadata engine 216 can create metadata information, for example the master file table 300 information, for the newly created and cached file or directory, in step 608. The metadata engine 216 can write information, such as, a new file name 314, permissions 320, and other information into a new entry in the virtual master file table 300. Thus, the virtual master file table 300 can be changed within the virtual master file table database 224. After writing the metadata and caching the new file or directory, there may be at least two possible ways of writing the new file data to the virtual disk 208. Each of these different methods will be described hereinafter.

In a first method, the network interface 214 may send a lock command to the cloud 108 to lock the network share, in step 610. In locking the network share, the storage system 110 ensures that no conflicting writes occur when the new file or directory is being written to the storage system 110. The lock command may be acknowledged by the cloud 108 in a message sent back to the network interface 214. If the lock is acknowledged, the network interface 214 can write through the changes to the file or directory, in step 612. Thus, the network interface 214 is passed data by the disk layer interface 210 from the local cache system to be written as block data within the cloud 108. After the changes are completely written, the method 600 may proceed to the end operation 618.

In a second method, the cached file or directory changes are saved in the cache until a disk dismount is received. The operating system 206 may then send, to the disk layer interface 210, a disk dismount during a shut down or other event, in step 614. The disk dismount causes the virtualization module 204 to disconnect the virtual disk 208 from the system. Thus, there will be no more writes or reads from the operating system 206 after the disk dismount. The disk layer interface 210 may then pass all the file changes, directory changes, any new files, and/or new directories to the network interface 214 after the disk dismount. The network interface 214 may then reconcile changes to the virtual disk 208, in step 616. In reconciling changes, the network interface 214 can resolve conflicting changes to the same file. In embodiments, the network interface 214 can use one or more known methods to resolve or reconcile the changes. For example, the network interface 214 may use the last change as the change to be stored in the virtual disk 208. In another example, the network interface 214 may use a voting process or some other reconciliation method. Once the changes are reconciled and which changes to be made are determined, the network interface 214 can then send the file or directory data to the cloud 108 to be stored as block data within the storage system 110. The cloud 108 can return information about where the information is stored in the network share. The returned information may be stored by the metadata engine 216 as one or more pointers 316 within the one or more newly created files 308 in the virtualization master file table 300.

Figure 7:
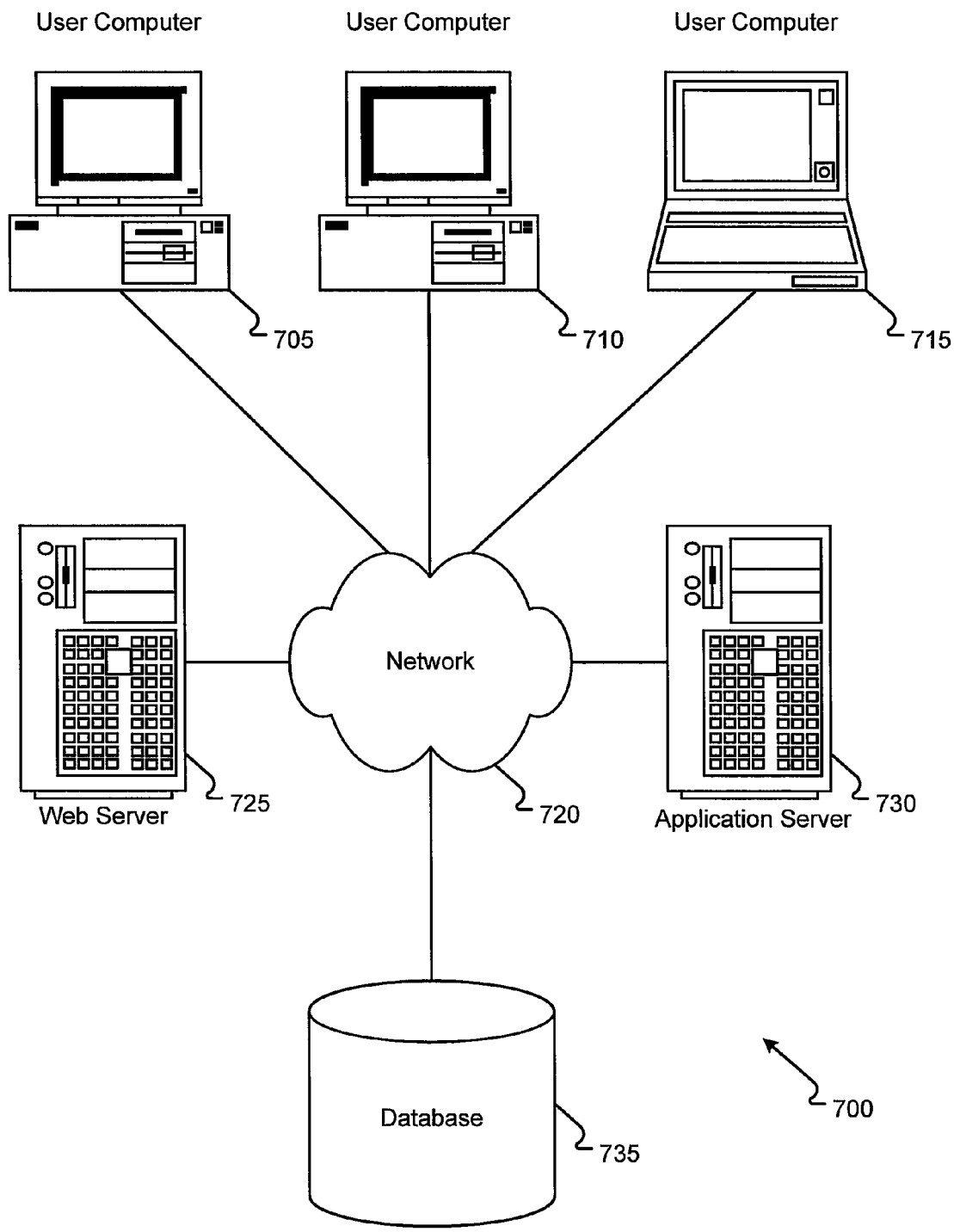
FIG. 7 is a block diagram of an embodiment of a computing environment.

FIG. 7 illustrates a block diagram of a computing environment 700 that may function as the servers, user computers, or other systems provided and described above. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730 which, can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 7 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-3.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

FIG. 8 illustrates one embodiment of a computer system 800 upon which the servers, user computers, or other systems or components described above may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 720 (FIG. 7) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for providing a virtual disk, the method comprising:

providing a computer system including a processor that executes an operating system, wherein the computer system is in communication with a network share that stores data;

the processor creating a disk layer interface that interfaces between the operating system and the virtual disk;

the processor determining which file system interacts with the operating system;

based on the determined file system, the processor creating metadata for the operating system to access file data stored in the virtual disk, wherein the metadata provides information to the determined file system for retrieving file data from and writing file data to the virtual disk;

the processor creating a network interface to communicate between the disk layer interface and the network share; and the processor exposing the virtual disk, through the disk layer interface, to the operating system, wherein the virtual disk appears as a local disk to the operating system and wherein the file data is stored in the network share;

the disk layer interface communicating with the operating system;

the disk layer interface intercepting a read request directed to the virtual disk for a file;

the disk layer interface returning file data associated with the file in response to the read request;

the network interface receiving the read request;

the network interface determining the network share that stores block data associated with the file;

the network interface communicating with the network share to read the block data from the network share; and the network interface returning the block data to the disk layer interface to be returned as the file data.

2. The method as defined in claim 1, wherein the file system is one of EXT3 or NTFS.

3. The method as defined in claim 1, wherein the metadata comprises file system metadata and file metadata.

4. The method as defined in claim 3, wherein the file system metadata provides metadata for the file system to interface with the virtual disk.

5. The method as defined in claim 3, wherein the file metadata provides a wrapper for the file data, wherein the wrapper exposes the file data as stored on a local disk, and wherein the wrapper provides a pointer to the network share to retrieve the file data.

6. The method as defined in claim 1, wherein the network share is stored in cloud storage, and the method further comprising transforming a directory structure in the cloud to a directory hierarchy for the file system.

7. The method as defined in claim 1, further comprising:
the processor receiving a read request for data stored on the virtual disk;
the processor triggering a virtual file system layer;
the processor accessing the network share via a pointer stored in the metadata;
the processor reading block data stored in the network share; and
the processor returning the block data as file data.

8. The method as defined in claim 1, further comprising:
the processor receiving new file data to be stored in the virtual disk;
the processor placing the new file data in a local file system cache;
the processor creating metadata for the new file data; and
the processor writing the new file data to the network share.

9. A non-transitory computer readable medium having stored thereon instructions that cause a computing system to execute a method for interacting with a virtual disk, the instructions comprising:
instructions to receive a read request, for data associated with a file stored on the virtual disk created on the computing system, from an operating system;
instructions to trigger a virtual file system layer, wherein the virtual file system layer exposes the virtual disk to the operating system as a local disk;
instructions to execute a disk layer interface on the computing system, wherein the disk layer interface is configured to:
read metadata associated with the file to access pointers to the file;
pass the pointers to a network interface;
return file data to the operating system;
instructions to execute the network interface on the computing system, wherein the network interface is configured to:
access the network share via a pointer stored in the metadata;
read the block data stored in the network share;
assemble the block data into file data; and
return the file data to the disk layer interface.

10. The non-transitory computer readable medium as defined in claim 9, wherein the metadata comprises file system metadata and file metadata.

11. The non-transitory computer readable medium as defined in claim 10, wherein the file metadata provides a wrapper for the file data, wherein the wrapper exposes the file data to the operating system as a file stored on a local disk, and wherein the wrapper provides the pointer to the network share to retrieve the block data.

12. The non-transitory computer readable medium as defined in claim 10, wherein the file system metadata provides metadata for the operating system to interface with the virtual disk.

13. The non-transitory computer readable medium as defined in claim 9, wherein the metadata is stored in a virtual master file table.

14. The non-transitory computer readable medium as defined in claim 9, further comprising:
instructions to receive new file data to be stored in the virtual disk;
instructions to place the new file data in a local file system cache;
instructions to create new metadata for the new file data; and
instructions to write the new file data to the network share.

15. A server, comprising:
a hardware processor, the hardware processor configured to execute:
an operating system;
a virtual disk, wherein the virtual disk is exposed to the operating system as a local disk, and wherein the virtual disk is configured to store data in a network share; and
a virtualization module in communication with the operating system and the virtual disk, the virtualization module configured to expose the virtual disk to the operating system as a local disk, wherein the virtualization module comprises:
a disk layer interface configured to:
communicate with the operating system;
intercept a read request directed to the virtual disk for a file;
return file data associated with the file in response to the read request;
a network interface in communication with the disk layer interface, the network interface configured to:
receive the read request;
determine the network share that stores block data associated with the file;
communicate with the network share to read the block data from the network share; and
return the block data to the disk layer interface to be returned as the file data.

16. The server as defined in claim 15, wherein the virtualization module comprises a metadata engine configured to:
create file system metadata read by the disk layer interface to expose the virtual disk as a local disk;
create file metadata read by the network interface to determine the network share that stores block data associated with the file.

17. The server as defined in claim 16, wherein the metadata engine is configured to store the file system metadata and the file metadata in a virtual master file table.

18. The server as defined in claim 17, wherein the virtual master file table comprises:
the file system metadata that comprises:
MFT data;
Secure data;
BITMAP data;
the file metadata that comprises:
a file name;
a pointer to a network share where the block data is stored;
directory structure information; and
permissions information.

19. The server as defined in claim 16, further comprising a directory organization module configured to:
   determine a directory structure of the block data stored in the network share; and
   provide metadata to the metadata engine associated with the directory structure.

\* \* \* \* \*